United States Patent [19]
Gotoda

[11] 4,384,554
[45] May 24, 1983

[54] PISTON RING WITH EXPANDER FOR INTERNAL COMBUSTION ENGINE

[75] Inventor: Yusuke Gotoda, Tokyo, Japan

[73] Assignee: Honda Giken Kogyo Kabushiki Kaisha, Tokyo, Japan

[21] Appl. No.: 153,018

[22] Filed: May 27, 1980

[30] Foreign Application Priority Data

Jun. 21, 1979 [JP] Japan .............................. 54-85442[U]

[51] Int. Cl.³ .............................................. F16J 15/9
[52] U.S. Cl. .................................. 123/193 P; 92/177; 277/160; 277/217
[58] Field of Search ................... 277/217, 160; 92/177; 123/193 P, 193 R

[56] References Cited

U.S. PATENT DOCUMENTS

| | | | |
|---|---|---|---|
| 1,747,306 | 2/1930 | Kolodziej | 92/177 |
| 1,869,108 | 7/1932 | Marien | 277/160 |
| 2,257,417 | 9/1941 | Kelley | 92/177 |
| 2,409,555 | 10/1946 | Gadoux et al. | 92/177 |
| 2,562,675 | 7/1951 | Mayfield | 277/160 |
| 4,198,065 | 4/1980 | Fukui | 92/177 |
| 4,256,067 | 3/1981 | Fukui | 92/177 |
| 4,266,787 | 5/1981 | Fukui | 277/217 |

*Primary Examiner*—Craig R. Feinberg
*Attorney, Agent, or Firm*—Lyon & Lyon

[57] ABSTRACT

A piston ring for use with an oblong piston and cylinder has a gap at one end. A resilient corrugated expander is positioned behind the piston ring and within the piston ring groove in the piston. The expander also has a gap and the two gaps are adjacent each other and in close alignment.

3 Claims, 4 Drawing Figures

PISTON RING WITH EXPANDER FOR INTERNAL COMBUSTION ENGINE

This invention relates to internal combustion piston engines and is particularly directed to improvements in piston rings and piston ring expanders for engines having oblong pistons and cylinders. Thus, the cylinder bore and piston cross section may be of elongated circular shape, or of substantially elliptical shape. This invention concerns an oblong piston ring for use of such pistons and cylinders as well as an oblong resilient corrugated expander for such piston rings. The piston ring has a gap at one of its longitudinal ends and the expander also has a gap at the same location. The two gaps are aligned and adjacent each other. This construction facilitates installation of the piston ring and expander into the piston groove and has further beneficial effects in the action of the piston ring and expander in service.

Other objects and advantages will appear hereinafter.

Figure 1:
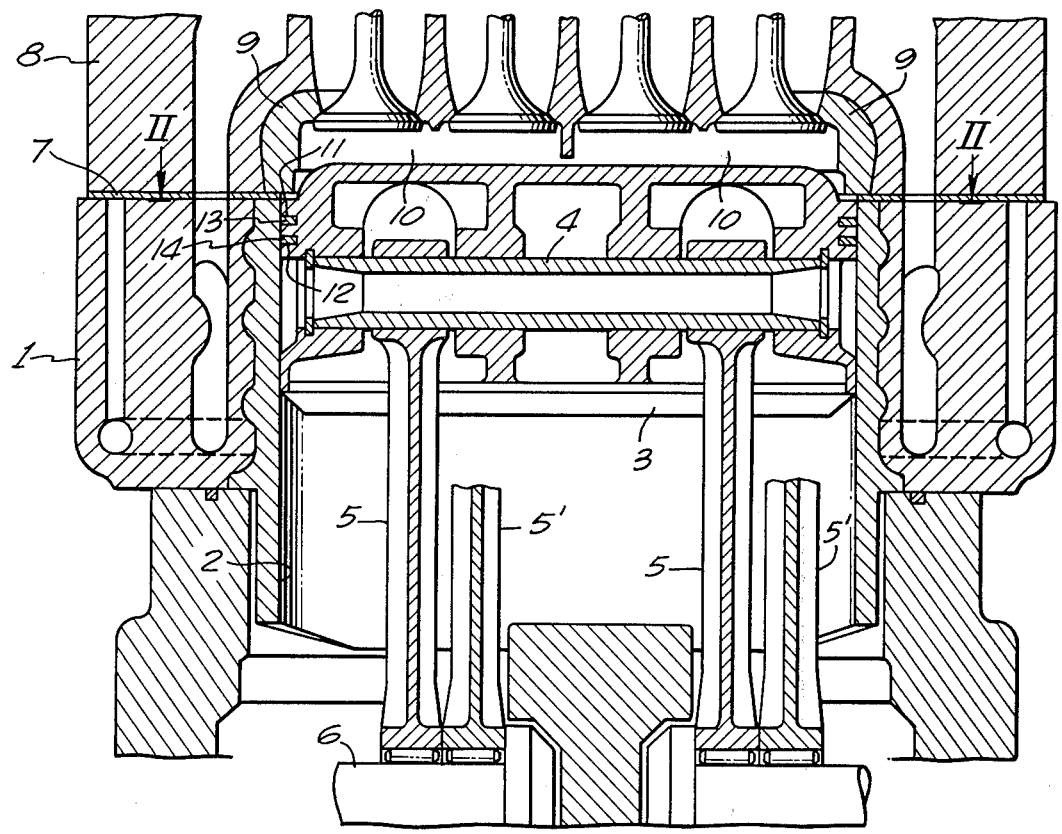
FIG. 1 is a sectional elevation showing a preferred embodiment of this invention.
Figure 2:
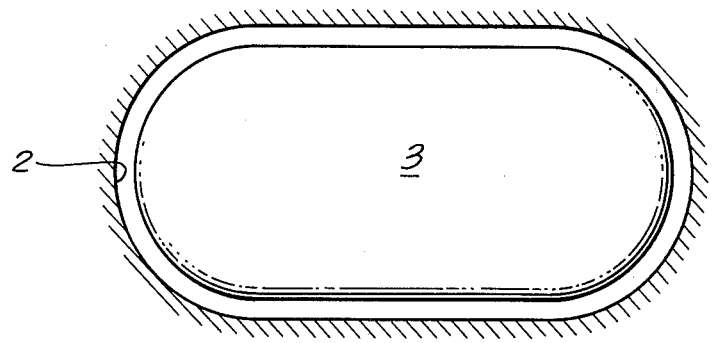
FIG. 2 is a transverse sectional detail taken substantially on the lines II—II as shown on FIG. 1.

Referring to the drawings, the internal combustion engine has a cylinder block 1 provided with a cylinder wall 2 having a transverse cross section of oblong shape. This shape may be an elongated circular shape or may be substantially elliptical. A piston 3 reciprocates within the cylinder wall 2 and has the same shape. A piston pin 4 connects the two connecting rods 5 to the engine crankshaft 6. Additional connecting rods 5' connect the crankshaft 6 to another piston, not shown. A gasket 7 is interposed between the cylinder block 1 and the cylinder head 8. A combustion chamber wall 9 provided on the bottom of the cylinder head 8 cooperates with the top surface of the piston 3 to form a combustion chamber 10. On the periphery of the piston 3 a piston ring groove 11 and an oil ring groove 12 are provided for the reception of the piston ring 13 and the oil ring 14, respectively.

The side portions 17 and 18 of the piston ring 13 each merge with the arcuate end portion 16 and also merge with arcuate end portions 15 which define a gap 19 between them. Mounted within the piston ring groove 11 and contacting the inner periphery 20 of the piston ring 13 is a resilient corrugated expander 21. The shape of the resilient corrugated expander 21 is similar to a sine wave having equally spaced crests 23. A gap 22 exists between ends of the expander 21 and this gap 22 is located adjacent the gap 19.

The piston ring 13 and resilient corrugated expander 21 can be assembled into the piston ring groove 11 with greater facility as compared with the case when these gaps 19 and 22 are not in alignment with each other. The piston ring 13 can be fitted very smoothly into the groove 11 with no interference from the expander 21 and only a minimum of widening of the gap 19. In this way assembling efficiency is improved as well as minimizing plastic deformation of the piston ring 13.

Figure 3:
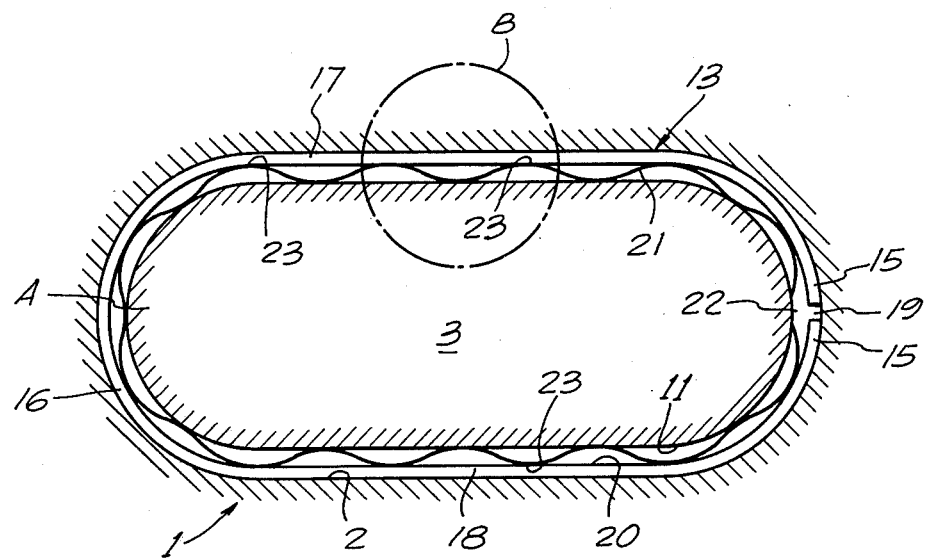
FIG. 3 is a view similar to FIG. 2, showing the piston ring and the resilient expander ring.
Figure 4:
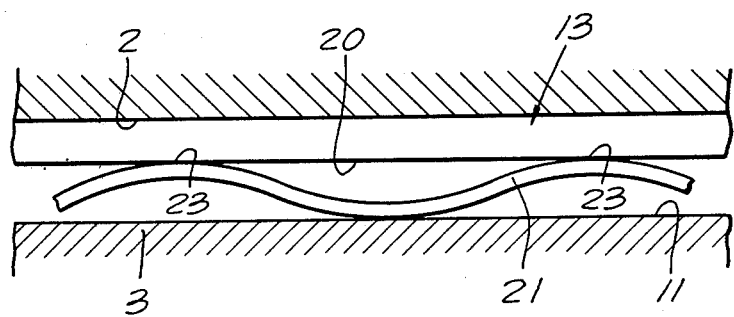
FIG. 4 is a sectional view of the portion "B" of FIG. 3, shown on an enlarged scale.

Moreover, when the expander 21 is compressed by the piston ring 13 or deforms as a result of thermal expansion or temperature change, the expander 21 displaces along the piston ring groove 11; the amount of this displacement is the smallest at or near the end opposite to the gap 19 (point A in FIG. 3). The direction of displacement is from point A toward the gap 19. The piston ring 13, when it is subjected to force from the outside or deforms as a result of thermal expansion or temperature change, displaces in a similar direction. Consequently, due to the oblong shapes of the expander 21 and piston ring 13, means are provided for the gaps 22 and 19, respectively, to be kept in alignment. Therefore, as compared with the case where the gaps 22 and 19 are not disposed in alignment with each other, frictional resistance developed between the piston ring and expander is smaller, permitting relative movement between them in a freer fashion. This in turn is effective to improve the action of the expander in following the movement of the piston ring, and it stabilizes the sealing pressure between the piston ring 13 and the cylinder wall to minimize blow-by of combustion gas. In addition, it prevents buildup of large local stresses in the expander to prevent resultant buckling and breakage of the expander.

Having fully described my invention, it is to be understood that I am not to be limited to the details herein set forth but that my invention is of the full scope of the appended claims.

I claim:

1. For use in an internal combustion engine having an oblong piston mounted to reciprocate within an oblong cylinder wall, the piston having a peripheral groove, the improvement comprising: a piston ring of oblong shape adapted to be received within the peripheral groove on the piston, the piston ring having side portions of equal length and each having one end merging with a relatively longer convex arcuate portion, the other end of said side portions merging with first and second relatively shorter convex arcuate portions, said shorter arcuate portions defining between them a gap, a resilient corrugated expander ring of oblong shape adapted to be received in the piston groove and having a sine wave shape having crests in which the respective crests of the corrugations alternately contact the bottom of the piston groove and contact the inner periphery of said piston ring, said corrugated expander ring having ends defining a gap located adjacent the gap in the piston ring in an aligned relationship, means maintaining said respective gaps in said aligned relationship via coacting oblong shapes of said expander ring and said piston ring, said gaps being positioned on the central longitudinal axis of the piston whereby said piston ring and said expander ring are permitted relative movement therebetween to displace in a similar direction along the peripheral piston groove.

2. The device of claim 1 in which the piston, cylinder wall and piston ring have an elongated circular shape in cross section.

3. The device of claim 1 in which the piston, cylinder wall and piston ring are substantially elliptical in cross section.

* * * * *